Figure 3:
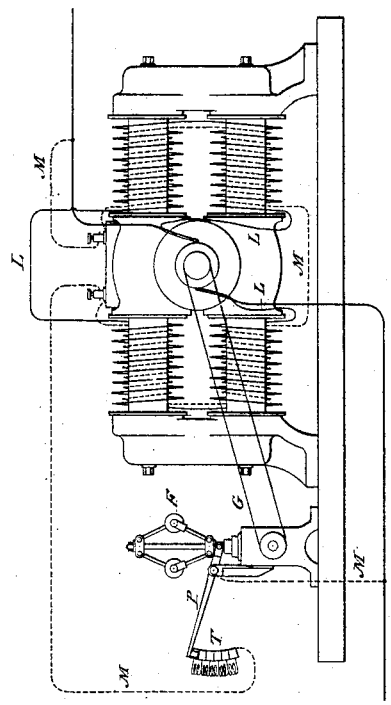

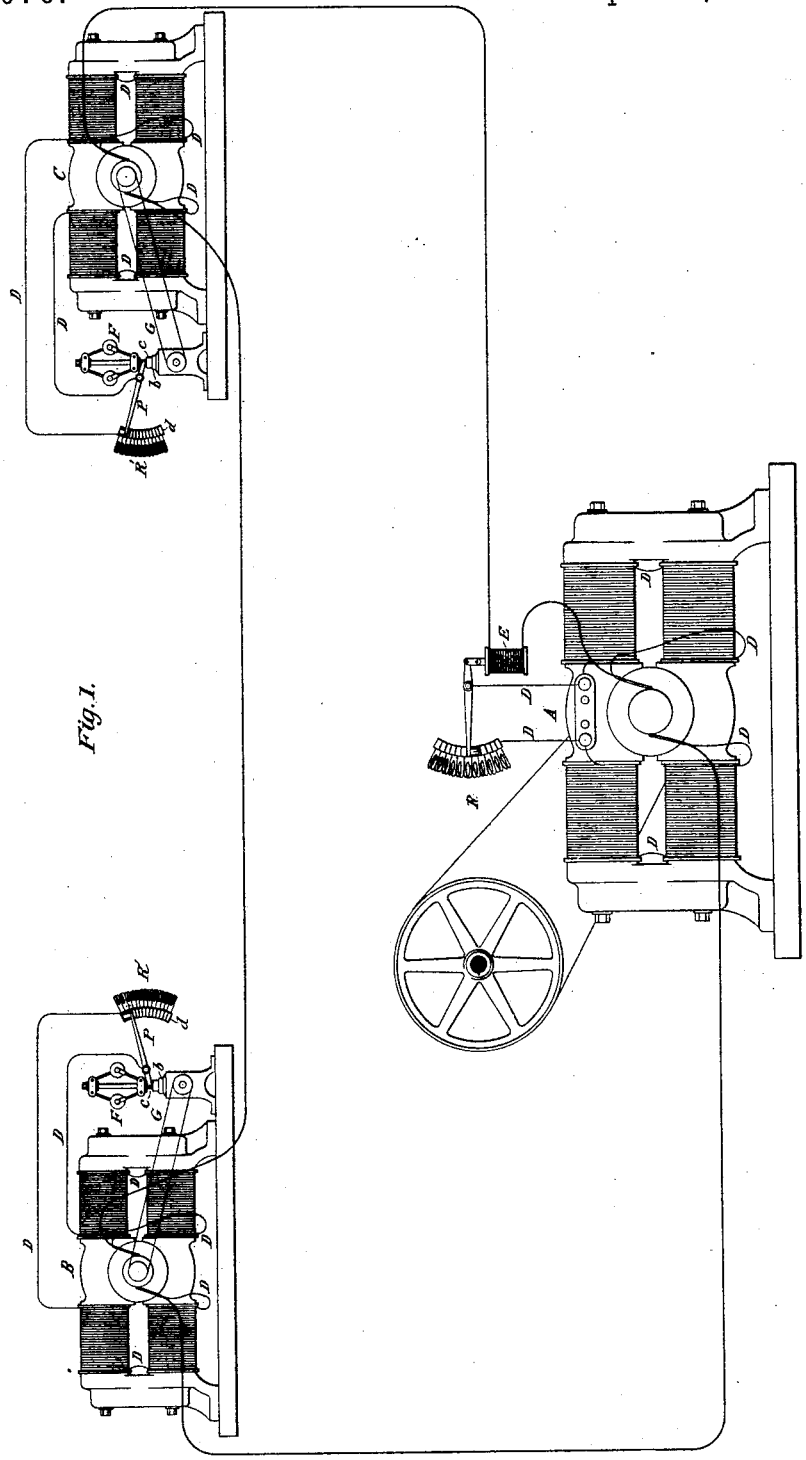

(No Model.) 2 Sheets—Sheet 2.

W. L. STEVENS.
SYSTEM FOR THE TRANSMISSION OF POWER BY ELECTRICITY.

No. 316,076. Patented Apr. 21, 1885.

Attest
Raymond F. Barnes
W. Frisby

Inventor:
William L. Stevens
By Parker W. Page
att.

UNITED STATES PATENT OFFICE.

WILLIAM L. STEVENS, OF BOSTON, MASSACHUSETTS.

SYSTEM FOR THE TRANSMISSION OF POWER BY ELECTRICITY.

SPECIFICATION forming part of Letters Patent No. 316,076, dated April 21, 1885.

Application filed July 3, 1884. (No model.)

*To all whom it may concern:*

Be it known that I, WILLIAM L. STEVENS, a citizen of the United States, and a resident of Boston, in the county of Suffolk and State of Massachusetts, have invented certain new and useful Improvements in Systems for the Transmission and Distribution of Power by Electricity, of which the following is a specification, reference being had to the drawings accompanying and forming a part of the same.

My present invention relates to systems for electrical transmission and distribution of power in which electro-magnetic motors are included in series in a circuit from one or more dynamo or magneto electric generators, and it involves a method of regulation applicable to these systems, the principal objects of which are to maintain a uniform flow of current in the working-circuit and to provide means for the independent regulation of each motor, by which its speed is kept practically uniform, while the power developed and the electrical energy consumed by the motor are varied to correspond with the load upon it or work to be performed by it. If two or more motors are connected in series in a circuit from a generator, each motor develops a counter electro-motive force acting in opposition to the flow of the current, and the aggregate counter electro-motive force remains constant so long as there is no variation in speed or adjustment of any of the motors. If, however, the speed of any motor be retarded by increasing its load or accelerated by diminishing its load without changing its adjustment, the variation in its counter electro-motive force increases or diminishes, according to the nature of such variation, or the strength of the current flowing. When motors are used under the conditions ordinarily encountered in practice, the work or load of each motor is apt to vary considerably from time to time, and when the motors are connected in series such variations of load not only vary the speed of the individual motor, but by reacting upon the strength of current throughout the entire circuit disturb the operation of the other motors.

To compensate for the variations of load, and to prevent them from reacting upon or sensibly affecting the speed or action of any of the other motors, whatever may be the direction or extent of the variation, I employ with each motor a device for varying in proportion to variations in the load the effect of the magnetic forces that operate to produce the rotation of the armature, and I use with the generator a current-regulator for maintaining approximately uniform strength of current in the working-circuit. This not only maintains uniform speed in each motor, but by reacting upon the counter electro-motive force developed by it varies the consumption of electrical energy in accordance with the work to be performed, and prevents variations in any one motor from affecting the current supplied to other motors in the same circuit.

In carrying out my invention I prefer to employ a dynamo-electric machine, with its field in derived or shunt circuit, and as a regulator therefor an electro-magnet in the main circuit operating upon mechanism that varies the resistance of the field-circuit substantially in the manner described in Patent No. 278,640, granted to Edward Weston, and dated May 29, 1883.

With each of the motors which are connected in series in the circuit from the generator I combine a centrifugal governor driven by the motor and a device controlled by the governor for gradually varying through the working range of the motor the mutual reaction of the field and armature by which the armature is rotated, and at the same time producing a corresponding variation in the counter electro-motive force developed by the motor. The means which I employ for this purpose consists of a rheostat or variable resistance arranged in any proper and well-understood manner for varying the current or currents energizing the field of the motor, and I combine a centrifugal governor with this in such manner that the rheostat will be in a condition to allow the maximum amount of current to flow around the field of the motor when the latter is at rest, and will be adjusted or varied by the governor when the motor is in operation, according to the load upon the motor. The magnetism of the field I may vary or control in several different ways—as by varying the resistance of the field-circuit, by diverting current from the coils of the field-magnets, or by neutralizing the effect of one current by another in any of the well-understood ways.

With constant strength of current in the working-circuit a motor develops a driving-power proportionate, within certain well-understood limits, to the magnetic intensity of the field. It is obvious, therefore, that the motor may be adjusted with great nicety to develop any required amount of power within the limits of its capacity by proper adjustment of the devices that control the flow of current around its field-magnets. The intensity of the magnetism of the field also determines the counter electro-motive force developed by the motor at a given speed, and accordingly the consumption of electrical energy in it. With this system of regulation the power developed by the motor and the electrical energy consumed by it vary approximately in unison, and are both independent of the speed of the motor, which is kept practically constant.

In practice motors are not driven for any considerable part of the time up to their full capacity, and with this system of regulation the rheostat that controls the intensity of the field will usually be in a condition to permit an adjustment in both directions, and it is preferable to so fix the nominal capacity of the motor that when it is carrying its full nominal load the strength of the field-magnets will be somewhat below the maximum, in order that the regulating devices may have a margin for responding to such slight temporary overloading as is liable to occur in practice.

I have illustrated the more important of the ways in which my invention is or may be carried out.

Figure 2:
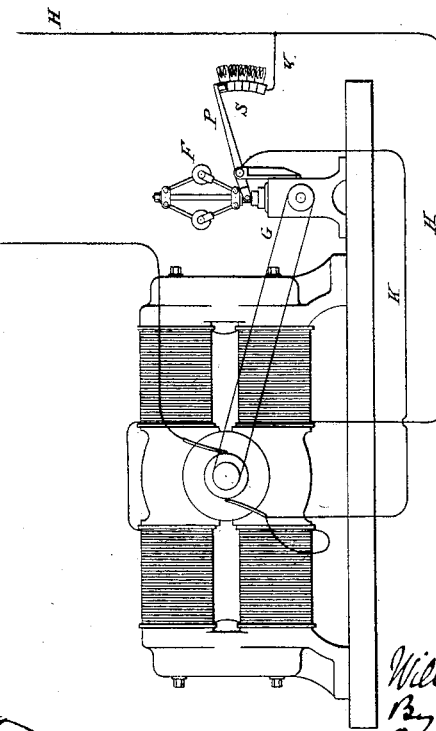

Figure 1 is a diagram of the system illustrating the relative arrangement of the several parts or members thereof. Figs. 2 and 3 are diagrams illustrating certain modifications of the means for varying the magnetic intensity of the field of the motor.

Referring to Fig. 1, which illustrates the most practicable manner of which I am at present aware of carrying out the invention, A designates a generator of given capacity, and B C an arbitrary number of motors included in series in the circuit from generator A. The generator and the motors in this case have field-circuits D in derivation to the main circuits, being what are commonly known as "derived field" or "shunt-wound" machines. In the field-circuit of the generator A is a variable resistance, R, controlled by an electro-magnet, E, in the main or working circuit in such manner as to vary the amount of current flowing around the field-magnets inversely to variation of resistance in the main circuit, whereby the amount of current produced by the generator may be maintained uniform. As before stated, the construction and principle of operation of this regulator are similar to those described in Patent No. 278,640. In the field-circuit of each motor is a variable resistance, R' R', which is controlled by means of a centrifugal governor, as F F. These governors are here shown as mounted independently of the motors and connected with their shafts by belts G G. They may, however, be driven in any other desired manner, and may differ greatly in construction, it being only required that they produce and are capable of imparting to the shifting contact-arms P of the rheostats R' a movement dependent upon the speed at which the motors tend to run. In practice it is desirable that a stop be placed in the path of downward movement of the sleeve c, to which the pivoted contact-arm is connected, in order that the balls may be prevented from entirely collapsing. The shoulder b of the standard that supports the governor may be utilized for this purpose. The contact-plates d of the rheostat should be so placed with reference to the path of movement of the contact-arm that when the governor is in its lowest position the minimum resistance will be inserted by said arm.

The operation of the system is as follows: On starting the system into operation each motor attains its normal speed more or less quickly, according to the load it has to carry. Up to a rate of speed nearly equal to that at which it should normally run the contact-arm P is not moved, for the reason that until that speed is reached the centrifugal force developed is not sufficient to spread the governor-balls farther, they being in a position of rest somewhat raised by the stop b, as above stated. The motor therefore receives the full effect of the current until its normal working-speed is reached, when any further increase of speed, however slight, operates to bring resistance into the field-circuit, which has the effect of decreasing the magnetic intensity of the field and lowering the counter electro-motive force until a point of equilibrium is reached at which the power developed is just sufficient to turn the armature at normal speed with the load which the motor is carrying at the time. With any increase or decrease of the load the governor varies the resistance of the field until a new condition of equilibrium is reached at which the power corresponds to the load. The less the load upon the motor the higher the resistance of the field-circuit and the weaker the magnetism of the field, and, in consequence, the less the consumption of electrical energy. If the load be wholly removed from the motor, the resistance of the field-circuit will be increased to such an extent that only sufficient power is developed to overcome the friction of the bearings. As the power may be varied in this way by almost insensible gradations throughout the working range of the motor, it is always possible for the contact-arm P to assume and maintain a position with reference to the contact-plates of the rheostat in which the power developed is equal to any load the motor is capable of carrying, and all vibrations and abrupt transitions are avoided.

With an ordinary governor applied in the manner described it is obvious that the speed of the motor will be affected somewhat by the load; but as it is practicable to obtain a considerable range of movement of the contact-arm from slight variations in the speed of the governor, the variations from normal speed are in practice very slight, and the regulation is sufficiently exact for ordinary uses.

It is essential for the proper operation of the system that some form of current-regulator be used with the generator to vary the electro-motive force developed by it, so as to maintain the strength of current approximately constant, or at least to prevent wide variations in the strength of the current, notwithstanding considerable variations in the aggregate counter electro-motive force developed by the motors; but the precise form of current-regulator employed is not material so long as proper regulation is secured.

The plan of regulating the motors by varying directly the magnetism of the field may be carried out in various ways other than that above described. For instance, in the case of a direct-circuit machine, the current may be shunted around the field by the rheostat. This is shown in Fig. 2, where the main circuit is designated by H H. Around the field-magnets is a shunt, K, containing a rheostat, S, controlled by the governor, as in the first system described. When the motor is at rest, the rheostat should be in condition to allow all or nearly all the current to flow through the field-coils. In all other respects the mechanical operations are similar to those in the case of a shunt-wound motor, the magnetism of the field being determined, however, by the relative proportion of current shunted around the same. Still another way of accomplishing the same result would be to use a field with oppositely-wound coils L M, Fig. 3, or two coils through which current is or may be passed in opposite directions. When the current in this case is flowing through coils L, the magnets are energized to their full strength. A rheostat, T, in derived circuit M, however, may be controlled by a centrifugal governor in a similar way to that above described and permit more or less current to pass through the said circuit M. The coils of this latter circuit are so wound with reference to the others that they will neutralize the effects produced by them; and so in other similar and well-understood ways the magnetism of the fields of the motors may be varied, for the purpose and in the manner above set forth.

What I desire to secure by Letters Patent is—

1. The combination, with an electric circuit and a generator and two or more motors connected in series therein, of means for maintaining in the circuit an approximately-uniform strength of current and controlling mechanism for each motor for maintaining uniform speed, and gradually varying in inverse proportion to variations in its load the magnetic intensity of the field-magnets, substantially as herein set forth.

2. The combination, with an electric circuit and a generator and two or more motors connected in series therein, of a current-regulator and automatic controlling mechanisms operated by variations in the speed of rotation of the motors to gradually and directly vary the magnetism of the fields of the motors, all substantially as herein set forth.

3. The combination, with an electric circuit and generator and two or more motors connected in series therein, of a current-regulator for maintaining an approximately-uniform current strength, centrifugal governors driven by the motors, and means controlled thereby for gradually varying the magnetism of the field-magnets of the motors, all substantially as set forth.

4. The combination, with an electric circuit and generator and two or more shunt-wound or derived field-circuit motors connected in series therein, of a current-regulator for maintaining an approximately-uniform current strength, centrifugal governors driven by the motors, and variable resistances or rheostats included in the field-circuits of the motors, and controlled by the centrifugal governors, in the manner and for the purpose set forth.

In testimony whereof I have hereunto set my hand this 30th day of June, 1884.

WILLIAM L. STEVENS.

Witnesses:
W. FRISBY,
RAYMOND F. BARNES.